June 1, 1915.

DRAWING

986

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

AWK.

UNITED STATES PATENT OFFICE.

WILLIAM BEACH, OF PHILADELPHIA, PENNSYLVANIA.

CLOSE STOVE FOR HEATING APARTMENTS.

Specification of Letters Patent No. 986, dated October 19, 1838.

*To all whom it may concern:*

Be it known that I, WILLIAM BEACH, of the city of Philadelphia, in the State of Pennsylvania, have invented an Improvement in the Close Stove for Heating Apartments, which I denominate the arborescent stove; and I do hereby declare that the following is a full and exact description thereof.

To the body of the stove, which is to contain the fuel, I give any form that is in harmony with the manner in which I construct the flue, or that part thereof through which the smoke and heated air ascend immediately after they escape from the chamber of combustion, as it is to this latter part only which I make a claim as constituting my improvement. Sometimes, for example, I intend to make the body A of the stove in the form of an urn; at others, in that of a small mound, appropriately ornamented with vegetables; or in that of a pedestal, with such devices upon it as taste may dictate. The interior of this part has its grate and ash-pit, and is otherwise furnished with the ordinary appendages for the convenient management of the fire. To the flue I give the form of a tree with its branches and foliage, making this part of cast-iron, and consisting usually, for the convenience of molding, of two raised plates, which when put together will fit closely at their edges, while in all the other parts, constituting the trunk, branches, and foliage, there will be a hollow space through which the heated air may pass on its way to an ordinary stove-pipe fitted on at C, or other means of being conducted into a chimney.

The trunk, branches, and foliage form a cavity extended in width like the outline of a tree or shrub; but the cavity within will rarely exceed two or three inches in depth, even in the part constituting the trunk, the intention being to bring the whole of the heated air into contact therewith as it passes off. I intend sometimes, in stoves of considerable width, to make a double flue, representing the trunks of two trees, which eventually unite by the intervention of their branches or otherwise. The two trunks may in this case have the body of the stove between them or be arranged in any other way which may be preferred. The advantage of this arrangement is that while the appearance of the arborescent flue is ornamental it collects and radiates from the form given to it a very large portion of that heat which ordinarily escapes in stoves of other constructions.

The only thing which I claim as my invention, and wish to secure by Letters Patent, is—

The giving to the flues of stoves the flattened, arborescent form and figure, in the manner and for the purpose set forth.

WILLIAM BEACH.

Witnesses:
JOHN THOMPSON,
JAMES ASH.